United States Patent
Scheffler et al.

(10) Patent No.: US 8,556,517 B1
(45) Date of Patent: Oct. 15, 2013

(54) BUSHING FOR OIL FILM BEARING

(71) Applicant: Siemens Industry, Inc., Alpharetta, GA (US)

(72) Inventors: Kenneth R. Scheffler, Dudley, MA (US); Peter N. Osgood, Westborough, MA (US); Thomas C. Wojtkowski, Jr., Shrewsbury, MA (US)

(73) Assignee: Siemens Industry, Inc., Alpharetta, GA (US)

(*) Notice: Subject to any disclaimer, the term of this patent is extended or adjusted under 35 U.S.C. 154(b) by 0 days.

(21) Appl. No.: 13/622,764

(22) Filed: Sep. 19, 2012

(51) Int. Cl.
*F16C 33/10* (2006.01)

(52) U.S. Cl.
USPC .................................. 384/322; 384/385

(58) Field of Classification Search
USPC ......... 384/129, 276, 282–286, 289–293, 322, 384/385, 389–393, 397–400
See application file for complete search history.

(56) References Cited

U.S. PATENT DOCUMENTS

| | | | |
|---|---|---|---|
| 2,249,843 A * | 7/1941 | Marsland | 384/292 |
| 3,343,893 A * | 9/1967 | Hall | 384/291 |
| 3,386,783 A | 6/1968 | Scheufler | |
| 3,453,031 A | 7/1969 | Bjork | |
| 4,159,152 A | 6/1979 | Bjork | |
| 4,459,048 A | 7/1984 | Stachuletz | |
| 5,456,535 A | 10/1995 | Chen | |
| 5,503,478 A | 4/1996 | Blaine | |
| 5,593,231 A | 1/1997 | Ippolito | |
| 6,585,419 B2 | 7/2003 | Imai | |
| 7,938,582 B2 * | 5/2011 | Barlerin et al. | 384/292 |
| 8,092,092 B2 * | 1/2012 | Barlerin et al. | 384/276 |

OTHER PUBLICATIONS

Direct Industry: Hydrodynamic bearings; The Virtual Industrial Exhibition, Illinois, 2012, http://www.directindustry.com/industrial-manufacturer/hydrodynamic-bearing-76346.html (2 pages).

* cited by examiner

*Primary Examiner* — Phillip A Johnson

(57) ABSTRACT

A bushing for rotatably supporting a journal comprises a cylindrical wall having an inner bearing surface configured and dimensioned to surround the journal. Oil is supplied continuously to a lubricated zone between the journal and the bearing surface. The thus supplied oil escapes in opposite directions from inboard and outboard ends of the lubricated zone. A circular channel is positioned to capture oil escaping from the outboard end of the lubricated zone. A drain conveys oil captured in the channel back in the direction of oil escaping from the inboard end of the lubricated zone.

7 Claims, 3 Drawing Sheets

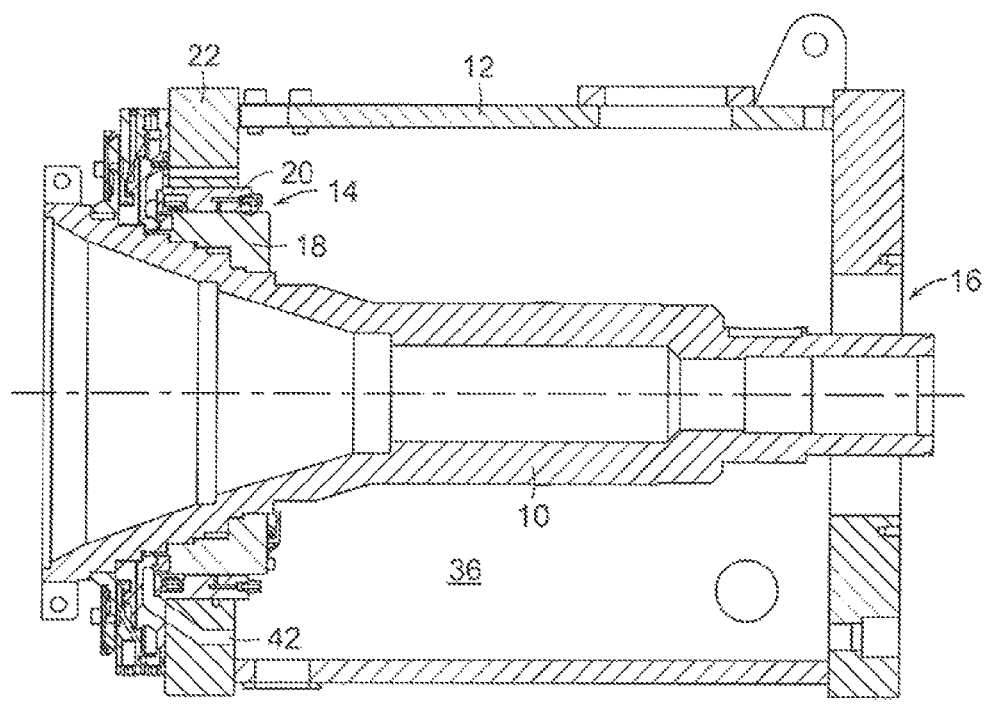
FIG. 1
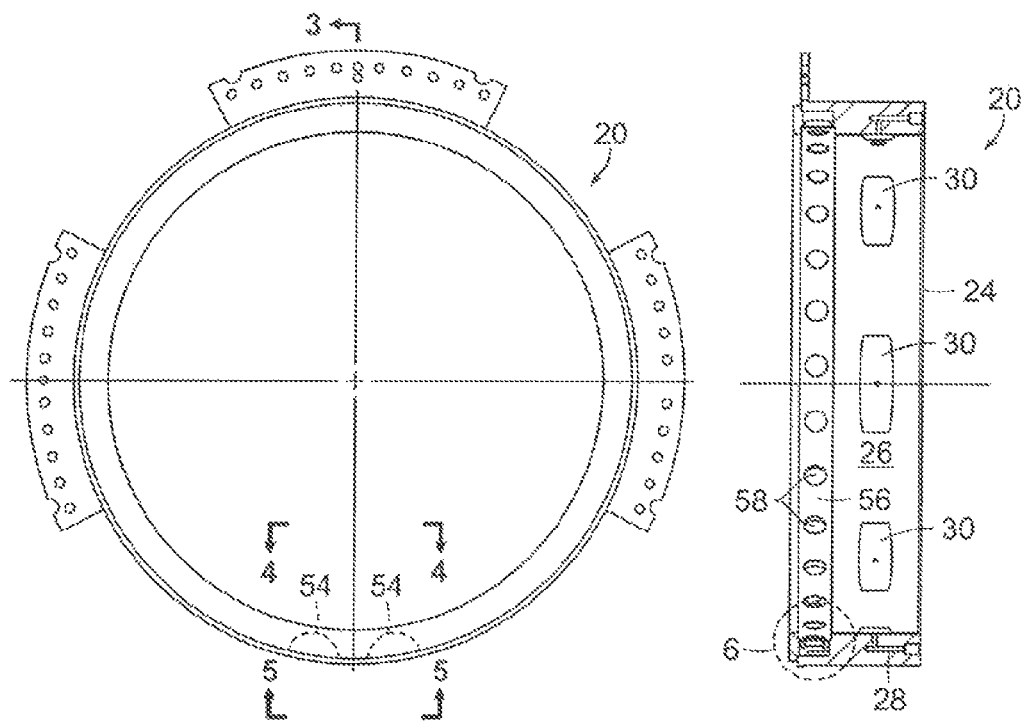
FIG. 2
FIG. 3

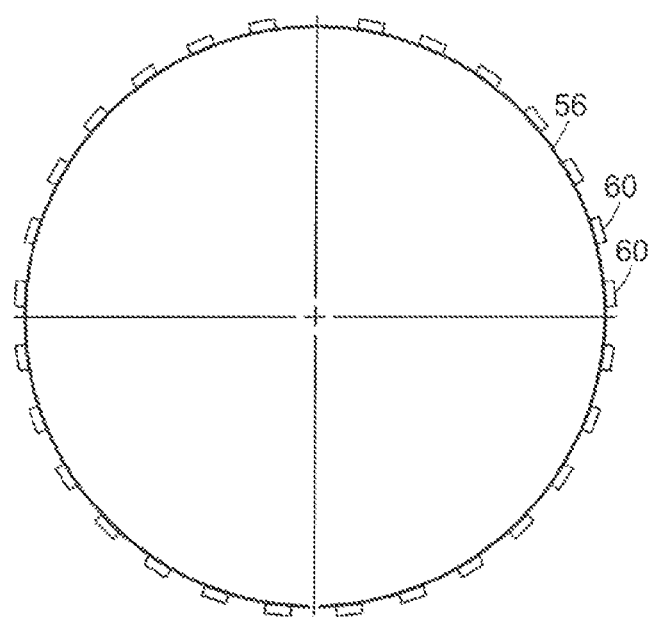
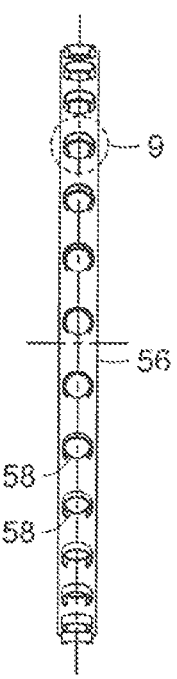
FIG. 7   FIG. 8
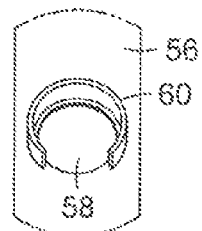
FIG. 9
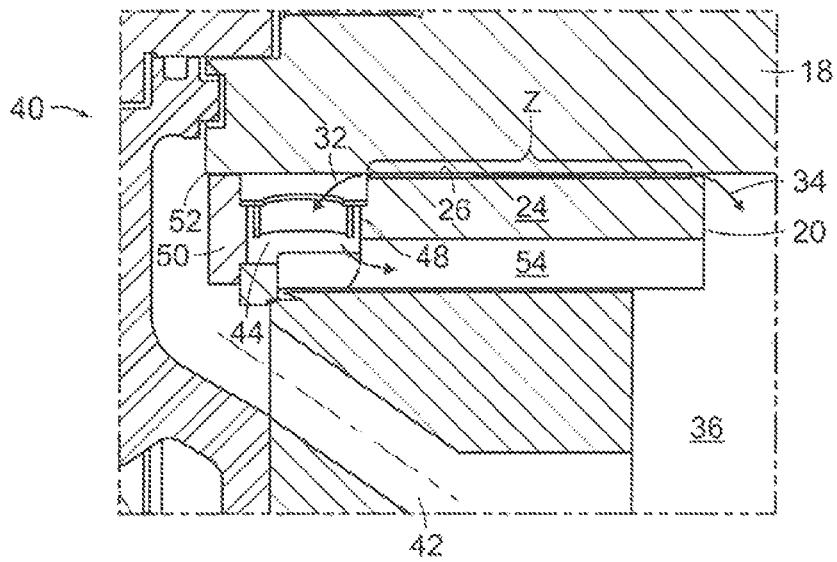
FIG. 10

BUSHING FOR OIL FILM BEARING

BACKGROUND

1. Field

Embodiments of the present invention relate generally to oil film bearings employed in various types of industrial equipment, including for example rolling mill laying heads, and are concerned in particular with improved bushings designed to more efficiently retain oil circulating through the bearings.

2. Description of Related Art

In a conventional oil film bearing, oil is supplied continuously to a lubricated zone between a rotating journal and the surrounding bearing surface of a fixed cylindrical bushing. The oil escapes from the inboard and outboard ends of the lubricated zone and is collected in a housing sump from which it is recirculated through cooling and filtering equipment before being reintroduced into the bearing.

The oil escaping from the inboard end of the lubricated zone flows directly into the sump. Oil escaping in the opposite direction from the outboard end of the lubricated zone is redirected by a seal assembly back to the sump. Under high speed operating conditions, such as for example those encountered in rolling mill laying heads, the seal assembly may be overwhelmed by the volume of oil escaping from the outboard end of the lubricated zone, resulting in leakage of oil from the bearing.

SUMMARY

Broadly stated, embodiments of the present invention address the above described leakage problem by providing an improved bushing incorporating features designed to capture and return oil escaping from the outboard end of the lubricated zone, thereby safeguarding the bearing seal from being overwhelmed by the escaping oil.

In exemplary embodiments, the bushing includes a circular channel positioned to receive the escaping oil, with passageways communicating with the channel to drain the oil back to the housing sump.

Preferably, the channel borders the outboard end of the lubricated zone.

In one exemplary embodiment of the present invention, the bushing further comprises a circular band seated in and spaced radially from the bottom of the channel. The circular band is perforated with circumferentially spaced holes, and may additionally comprise fins projecting radially outwardly from the band and towards the bottom of the channel. Preferably, the fins comprise partially circular collars surrounding the holes perforating the band.

These and other objects, features and advantages of the present invention will become more apparent upon reading the following detailed description in conjunction with the accompanying drawings.

BRIEF DESCRIPTION OF THE DRAWINGS

FIG. 1 is a sectional view of a rolling mill laying head showing one end of a quill rotatably supported by an oil film bearing incorporating a bushing in accordance with an exemplary embodiment of the present invention;

FIG. 2 is a front view of a bushing, in accordance with an exemplary embodiment of the present invention;

FIG. 3 is a sectional view taken along line 3-3 of FIG. 2;

FIG. 7 is a front view of a circular band, in accordance with an exemplary embodiment of the present invention;

FIG. 8 is a side view of the circular band;

FIG. 9 is an enlarged side view of the circled portion in FIG. 8; and

FIG. 10 is an enlarged sectional view of a lower portion of the bearing shown in FIG. 1.

DETAILED DESCRIPTION

Figure 4:
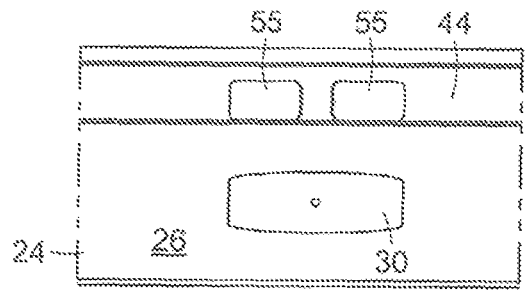
FIGS. 4 and 5 are views taken respectively along lines 4-4 and 5-5 of FIG. 2.
Figure 5:
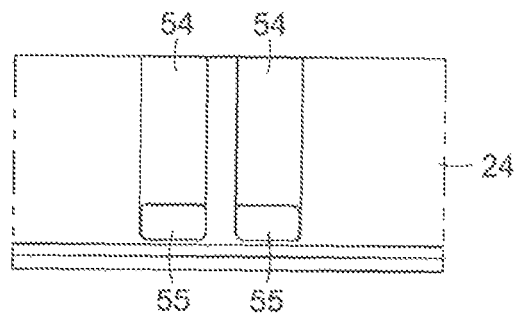

The components described hereinafter as making up the various embodiments are intended to be illustrative and not restrictive. Many suitable components that would perform the same or a similar function as well as the materials described herein are intended to be embraced within the scope of embodiments of the present invention.

Referring now to the figures, wherein like reference numerals represent like parts throughout the views, embodiments of the present invention will be described in detail.

With reference initially to FIG. 1, the quill 10 of a rolling mill laying head is shown rotatably support in a housing 12 between bearings 14, 16. Bearing 14 is an oil film bearing, preferably of the hydrostatic type, comprising a journal 18 in the form of a stepped sleeve fixed to the quill and surrounded by a bushing 20 in accordance with an exemplary embodiment of the present invention. The bushing 20 is fixed in a front wall 22 of the housing. Bearing 16 may comprise a conventional roller bearing, or another oil film bearing.

With reference additionally to FIGS. 2-5 and 10, the bushing 20 comprises a cylindrical wall 24 having an inner bearing surface 26 configured and dimensioned to surround the journal 18. Oil is continuously supplied to a lubricated zone "Z" by means of inlet passageways 28 leading to circumferentially spaced recesses 30 in the bearing surface.

As the quill rotates during operation of the laying head, the thus supplied oil escapes in opposite directions from inboard and outboard ends of the lubricated zone Z, as indicated by arrows 32, 34 in FIG. 10.

Oil escaping in direction 34 from the inboard end of zone Z is received in a sump 36 defined by the interior of housing 12. Conventionally, oil escaping in direction 32 from the outboard end of zone Z would be contained solely by a labyrinth seal 40 for return to the housing sump 36 via passageway 42.

But in order to prevent the seal 40 from being overcome by the outboard escape of oil from zone Z, and in accordance with an exemplary embodiment of the present invention, the bushing 20 further comprises a circular channel 44 positioned to capture the escaping oil.

Figure 6:
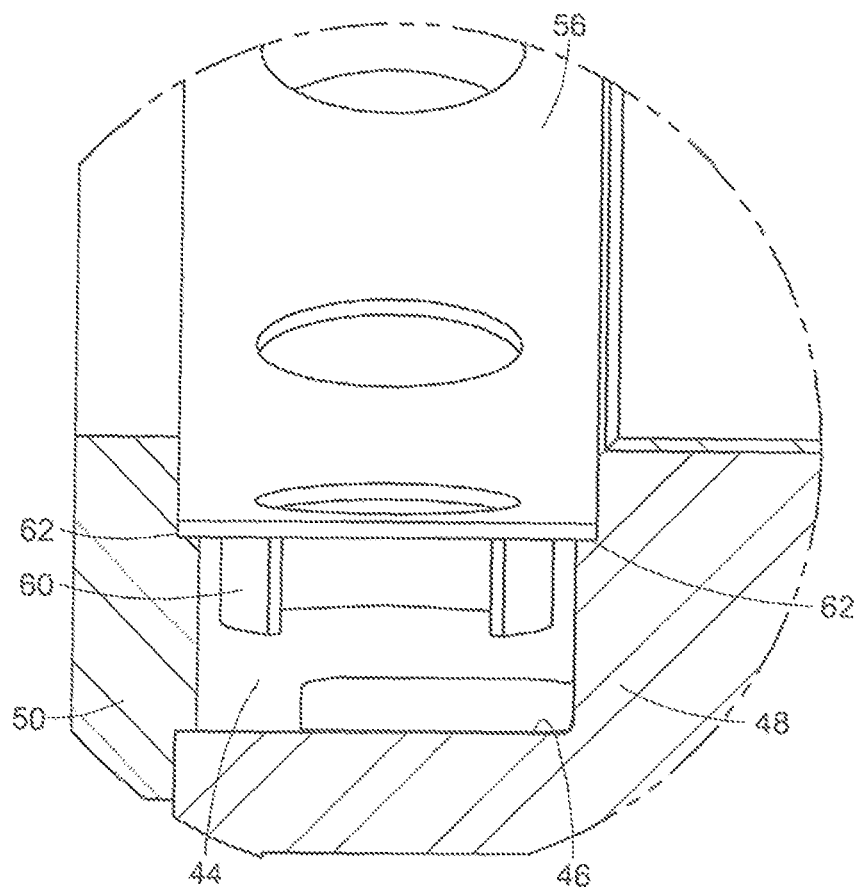
FIG. 6 is an enlarged view of the circled portion in FIG. 3.

As can best be seen in FIG. 6, channel 44 is defined by a bottom wall 46 and mutually spaced inboard and outboard side walls 48, 50. Preferably, the inboard side wall 48 borders the outboard end of the lubricated zone Z, and as shown in FIG. 10, the outboard wall 50 is configured and arranged to cooperate at 52 with a surface of the journal 18 to enclose the channel 44.

Exit passages 54 in the bushing communicate with drainage ports 55 in the channel 44 and serve to convey oil captured in channel 44 back to the housing sump 36 in the direction 34 of oil escaping from the inboard end of zone Z. The channel 44 and its communicating exit passages 54 thus serve to short circuit and return oil escaping from the outboard end of zone Z, thus minimizing the exposure of the seal 40 to the escaping oil.

In order to enhance the entrapment of oil escaping from the outboard end of zone Z, a circular band 56 may preferably be seated in channel 44. As shown in FIGS. 7-9, the circular band 56 is perforated with circumferentially spaced holes 58. Fins 60 project radially from the circular band 56. Preferably, the fins 60 may comprise collars partially surrounding the holes 58. As can be best seen in FIG. 6, the circular band 56 may be seated on internal ledges 62 in the channel side walls 48, 50 in a position spaced radially from the channel bottom 46, with the fins 60 projecting radially towards the channel bottom. The fins 60 minimize whirling of the oil around the channel 44, thereby encouraging gravity flow back to the housing sump 36 via drainage passages 54.

While exemplary embodiments of the invention have been disclosed, modification, additions and deletions can be made without departing from the spirit and scope of the invention and its equivalents, as set forth in the following claims.

What is claimed is:

1. A bushing for rotatably supporting a journal, said bushing comprising:
   a cylindrical wall having an inner bearing surface configured and dimensioned to surround said journal;
   means for continuously supplying oil to a lubricated zone between said journal and said bearing surface, with the thus supplied oil escaping in opposite directions from inboard and outboard ends of said zone;
   a circular channel positioned to capture oil escaping from the outboard end of said zone; and
   a drain communicating with said circular channel, said drain being configured and arranged to convey oil captured in said channel back beneath said inner bearing surface and to and out from the inboard end of said lubricated zone.

2. The bushing of claim 1 wherein said channel is defined by a bottom and mutually spaced inboard and outboard side walls, with said inboard side wall bordering the outboard end of said lubricated zone.

3. The bushing of claim 2 wherein said outboard wall is configured to cooperate with a surface of said journal to enclose said channel.

4. A bushing for rotatably supporting a journal, said bushing comprising:
   a cylindrical wall having an inner bearing surface configured and dimensioned to surround said journal;
   means for continuously supplying oil to a lubricated zone between said journal and said bearing surface, with the thus supplied oil escaping in opposite directions from inboard and outboard ends of said zone;
   a circular channel positioned to capture oil escaping from the outboard end of said zone, said channel being defined by a bottom and mutually spaced inboard and outboard side walls, with said inboard side wall bordering the outboard end of said lubricated zone;
   a drain for conveying oil captured in said channel back in the direction of oil escaping from the inboard end of said zone; and
   a circular band perforated by circumferentially spaced holes, said band being received in and spaced radially from the bottom of said channel.

5. The bushing of claim 4 further comprising fins projecting radially outwardly from said circular band and towards the bottom of said channel.

6. The bushing of claim 5 wherein said fins comprise collars partially surrounding the holes in said band.

7. A bushing for rotatably supporting a journal, said bushing comprising:
   a cylindrical wall having an inner bearing surface configured and dimensioned to surround said journal;
   means for continuously supplying oil to a lubricated zone between said journal and said bearing surface, with the thus supplied oil escaping in opposite directions from inboard and outboard ends of said zone;
   a circular channel positioned to capture oil escaping from the outboard end of said zone, said circular channel being defined by a bottom and mutually spaced inboard and outboard side walls, said inboard side wall bordering the outboard end of said lubricated zone, and said outboard wall cooperating with a surface of said journal to enclose said channel;
   a drain for conveying oil captured in said channel back in the direction of oil escaping from the inboard end of said zone; and
   a circular band seated in said circular channel, said circular band being perforated by circumferentially spaced holes partially bordered by fins projecting radially outwardly towards the bottom of said circular channel.

* * * * *